Jan. 3, 1928.
C. EISLER
1,655,051
MACHINE FOR MAKING STEMS FOR INCANDESCENT LAMPS
Filed July 1, 1926    4 Sheets-Sheet 1
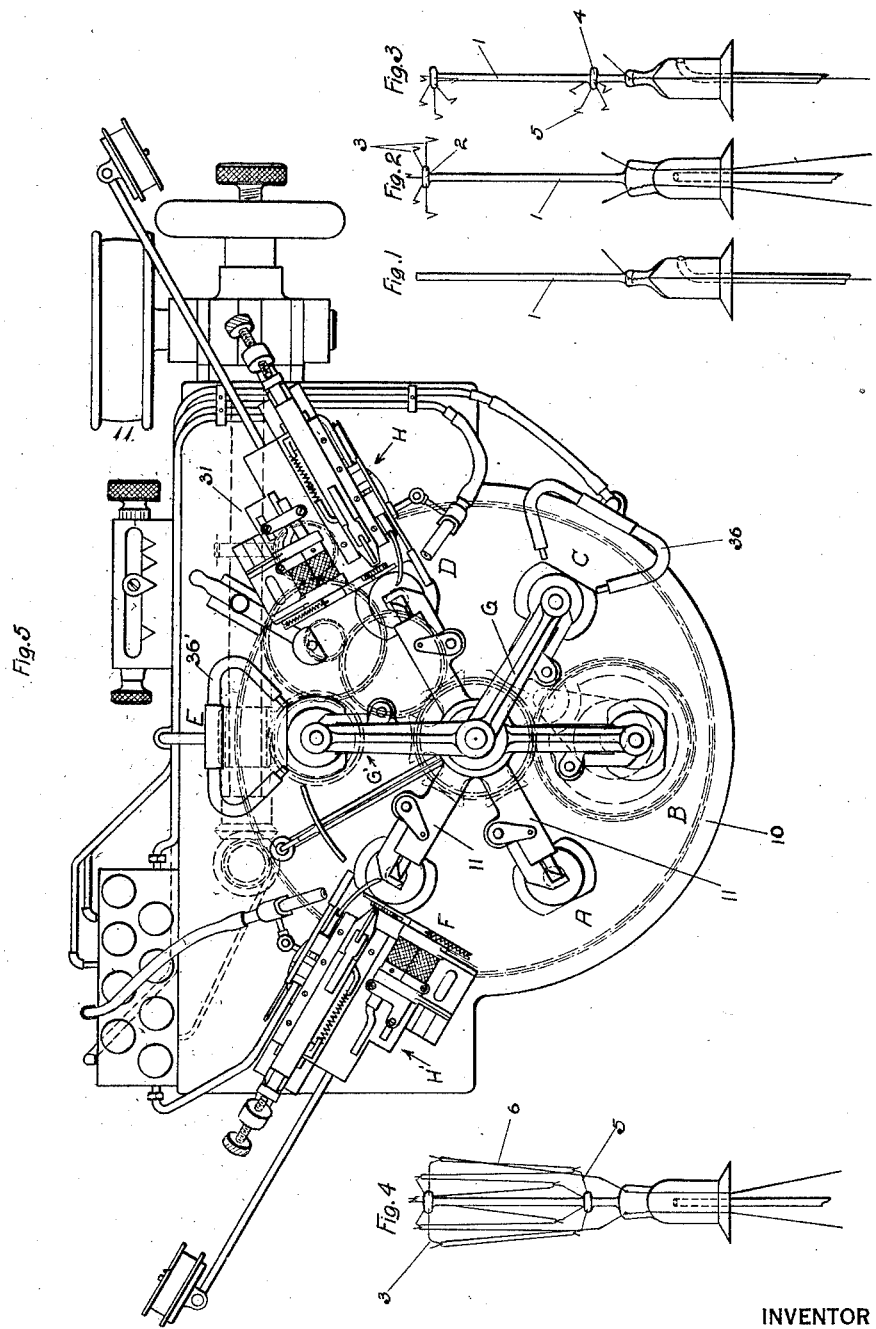
INVENTOR
CHARLES EISLER
BY Richard Eyre
ATTORNEY

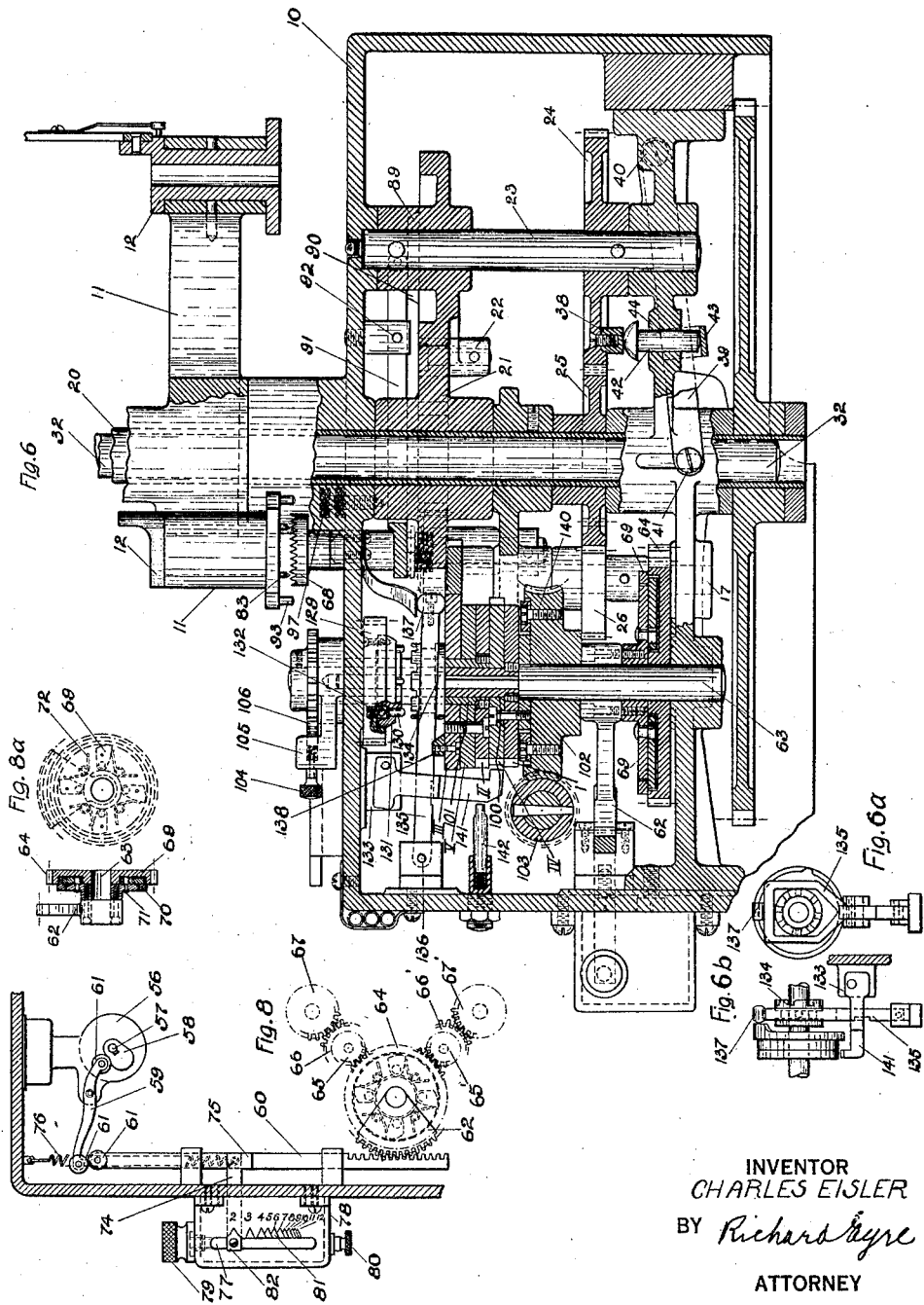

Jan. 3, 1928.
C. EISLER
1,655,051
MACHINE FOR MAKING STEMS FOR INCANDESCENT LAMPS
Filed July 1, 1926 4 Sheets-Sheet 3
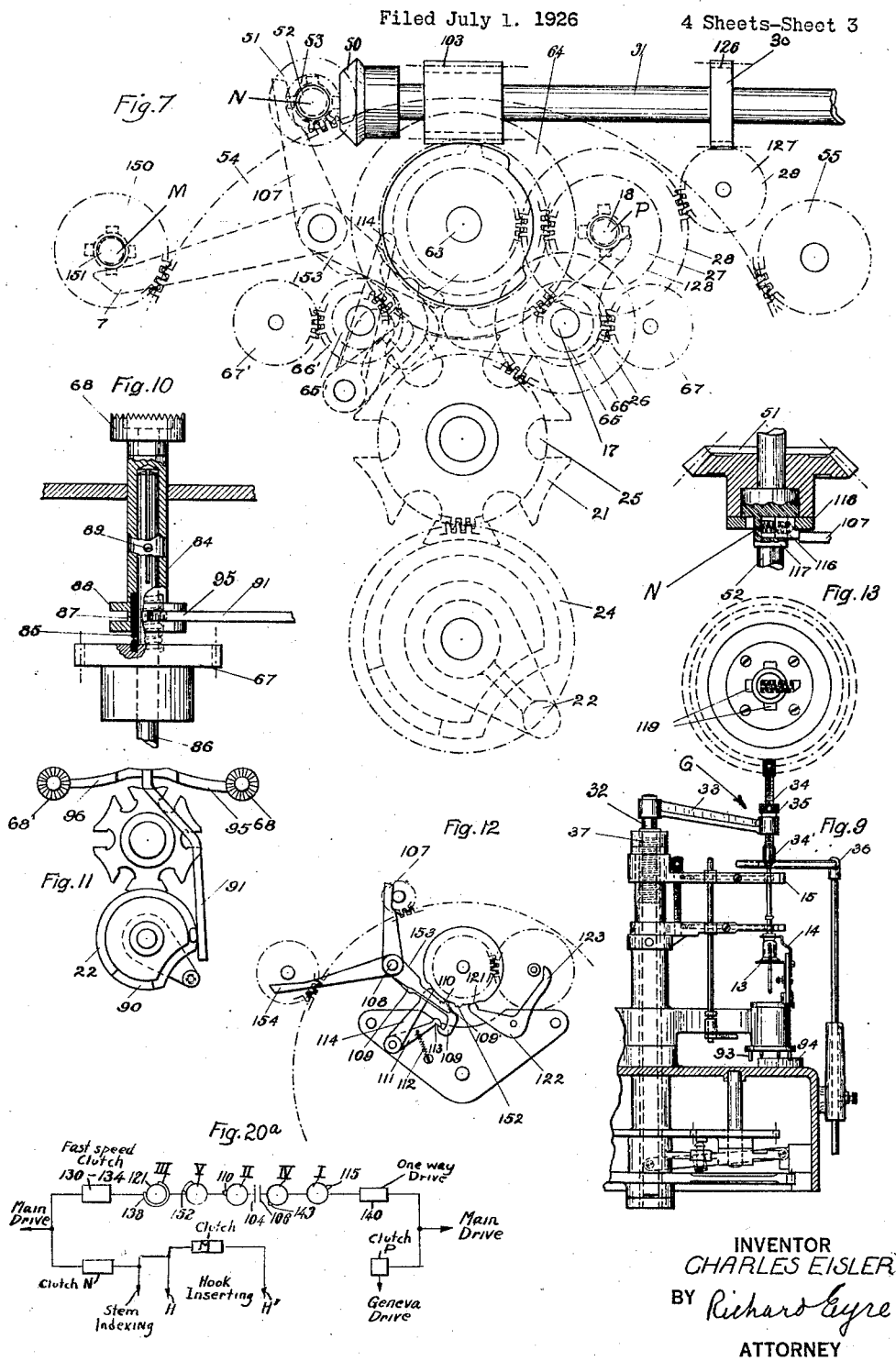
INVENTOR
CHARLES EISLER
BY Richard Eyre
ATTORNEY

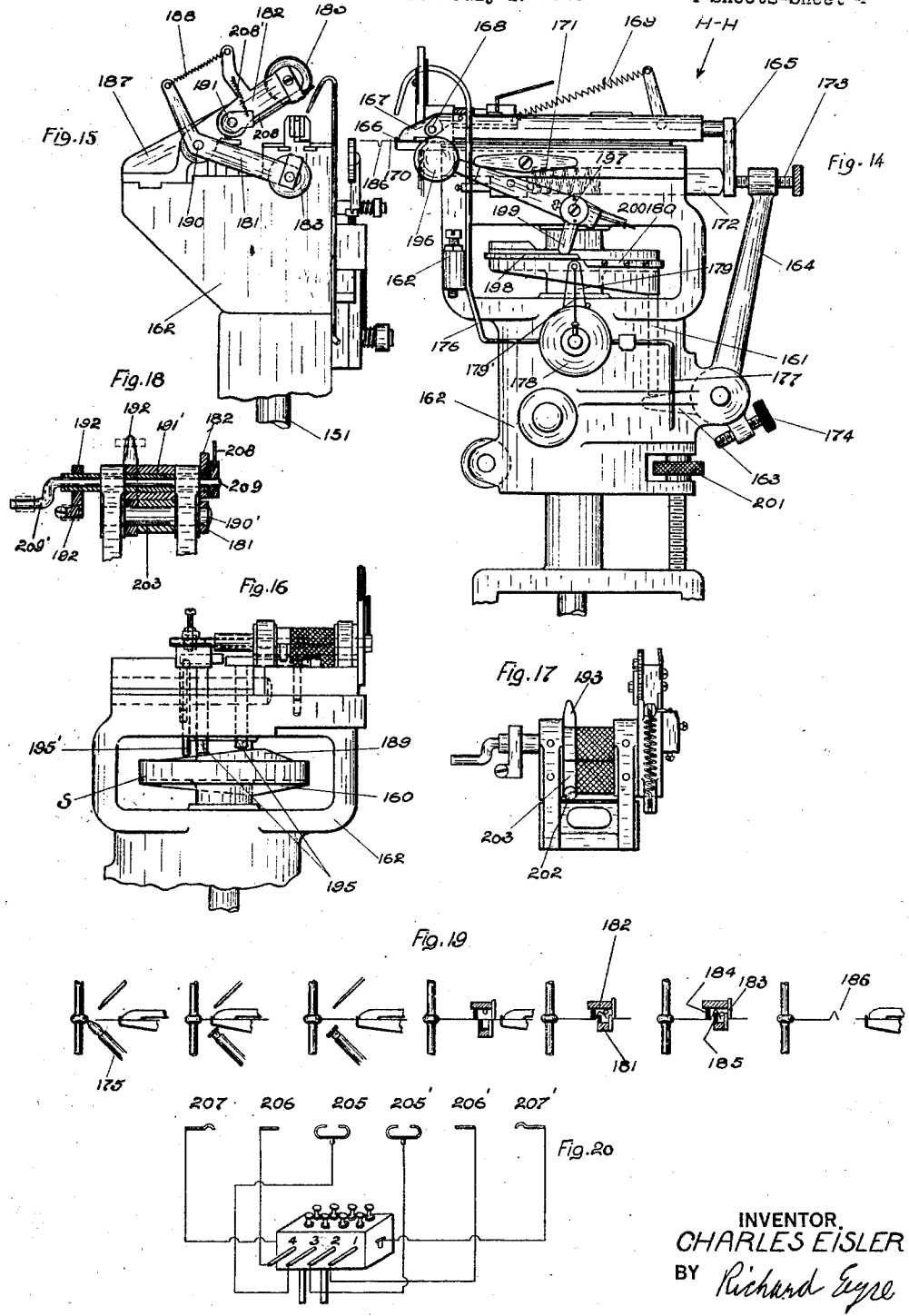

Patented Jan. 3, 1928.

1,655,051

UNITED STATES PATENT OFFICE.

CHARLES EISLER, OF NEWARK, NEW JERSEY.

MACHINE FOR MAKING STEMS FOR INCANDESCENT LAMPS.

Application filed July 1, 1926. Serial No. 119,883.

My invention relates to the manufacture of incandescent lamps and particularly to an apparatus for automatically forming, inserting and arranging hooks or supports on incandescent lamp stems upon which the filaments are draped.

The object of the invention generally is a machine whereby the forming of the hooks or supports and the insertion and spacing thereof in and about the stem arbors may be automatically and rapidly effected with a minimum of labor and attention. A particular object of the invention is a machine of this general character but readily adaptable at the will of the operator to the insertion of a variable number of hooks and supports properly spaced, depending upon the adjustments desired, the adjustment and shifting from one type of stem to another being readily effected and the proper number of hooks inserted without varying the speed of operation of the hook inserting device.

For a better understanding of the invention, including the above indicated novel features and others which will hereinafter appear, reference may be had to the drawings forming a part of this application wherein:

Figs. 1–4 indicate the general character of the incandescent lamp stems to be operated on, Fig. 5 is a plan view of the apparatus, Fig. 6 is a vertical sectional view therethrough, Fig. 7 is a diagrammatic view of parts of the drive mechanism, Fig. 8 is a view of certain other parts thereof, Fig. 8ª is a detail view thereof, Figs. 6ª and 6ᵇ are detail views, Fig. 9 is a side view of certain of the mechanism, Fig. 10 is a detail view of a part of the mechanism, Fig. 11 is a plan view of other parts thereof.

Fig. 12 is a view of parts of the drive and control mechanism,

Fig. 13 is a detail view of one of the clutches,

Figs. 14–16 are side views of the hook inserting element of the combination,

Figs. 17 and 18 are detail views thereof,

Fig. 19 is a diagrammatic view illustrating the hook inserting operations,

Fig. 20 is a diagrammatic view of the manifold connections,

Fig. 20ª is a diagrammatic view of the correlated mechanisms, and

Figs. 21–27ª are views of a modified machine.

Referring to Figs. 1 to 4 inclusive, I have indicated a mount or mount stem for electric incandescent lamps or the like into which are to be incorporated the hooks or supports for the filaments to be draped thereupon, and my machine is adapted to this purpose. The standard stem for an incandescent lamp is indicated in Fig. 1 and includes a glass rod 1. In Fig. 2 the rod 1 has a button 2 formed on the upper end thereof and the supports or hooks 3 are inserted radially into this button. In Fig. 3 a button 4 is formed near the lower end of the rod and hooks 5 are inserted radially therein. Fig. 4 shows the filament 6 draped about the supports 3 and 5.

My novel machine for forming the buttons and inserting the supports or hooks will now be described. Referring to the drawings, particularly Figs. 5–9, my machine includes a main supporting frame or base 10 and upon this base there is revolubly supported a main frame or spider consisting of a multiple number of radially disposed supporting arms 11. And the particular example illustrated is a six-position machine including six of these arms 11. Each of these arms 11 has journaled on the outer end thereof a stem holder 12 having projecting up therefrom suitable supporting and alining arms 13, 14 and 15 which are adapted to receive and support the stems indicated in Fig. 1. Each arm 11 together with its stem support 12 is adapted to be indexed around from position to position and to occupy each of the positions A, B, C, D, E, F of the machine. Positions A and B are the unloading and loading positions, and upon advancing to the position C the button forming mechanism indicated generally by G goes into operation to form the buttons 2. At position D the hooks or supports 3 are inserted in the buttons 2 by means of a suitable hook or support inserting mechanism designated generally by H. At positions E and F the other buttons 4 are formed and the hooks inserted respectively by the button forming mechanisms G' and H'. In Fig. 4 the filament mount is indicated as having five of the hooks or supports 3 and four of the hooks or supports 5 and I have devised a machine including readily operable and adjustable means for varying the number of supports or hooks to be inserted with the proper spacing thereof according to each adjustment, and ordinarily in commercial lamps it is desirable to have one less hook at the lower end of the mount than at the upper end. Accordingly my machine is adapted to these purposes.

The spider, including the arms 11, is mounted upon a hollow shaft 20 which is suitably journaled in the main frame 16, and to this hollow shaft 20 there is secured a geneva 21 which is engaged by a Geneva driver 22 to advance or index the spider one position at each revolution of the driver 22, the latter being carried by the shaft 23. The main drive shaft for the machine is indicated at 31 (Figs. 5, 7) which may be continuously driven by any suitable power means, as for example, an electric motor (not illustrated). The drive for the geneva includes the gear 24 on the shaft 23, the gear 25 journaled on the hollow shaft 20, the gears 26 and 66 on the shaft 17, the pinions 27 and 28 on the shaft 18, and the pinion 29 and the bevel 30 on the main drive shaft 31. Between the gears 27 and 28 there is disposed a clutch P controlled in a manner hereinafter described.

The button forming mechanism G includes a reciprocable rod or shaft 32 which is mounted within the hollow shaft 20 and carries on its upper end a radially disposed arm 33, this arm 33 carrying on its outer end an adjustable arm 34. The latter is screw-threadedly adjustable in a similarly threaded opening in the outer end of the arm 33 and has a tightening nut and screw 35 for fixing the pressing rod 34 in a definite fixed position. The rod 34 has on its lower end a pressing button or knob 34′ and the arrangement is such that as each arm 11 of the spider moves over to position C the stem of rod 1 is carried immediately below and in line with the pressing rod 34. At this point there are disposed the heating torches 36 for directing the heating flames against the upper end of the glass rod 1 in order to soften the same. While the hooks and supports are being inserted at position D in the next succeeding step the torches soften the end of the stem rod 1 and the rod 32 with the button forming arms 33 and 34 is reciprocated downwardly to bring the knob 34′ into engagement with the softened end of the stem to form the button 2 thereon. Normally the button forming device is maintained in its inoperative position by a spring 37, and the mechanism for actuating it against the tension of the spring includes a cam 38 carried by the gear 24 which actuates a forked lever 39, the latter being pivoted for pivotal movement about the axis 40 and having fingers 41 passing through suitable slots in the hollow shaft 20 and engaging the rod 32. There is an intermediate pin 42 between the cam 38 and a bridge 43 fastened to the under side of the forked arm 39, this pin 42 passing through a suitable opening in the bracket 44 which carries the Geneva driver shaft 23. The button forming mechanism G, therefore, is operated simultaneously with the operation of the Geneva driver 22. The button forming mechanism G′ is identical with the mechanism G and is operated simultaneously therewith to form the lower buttons 4 on the stem as each arm 11 of the spider advances to the position E of the machine, the torch 36′ indicated as having a double flame playing upon the portion of the glass rod 1 in which the button is to be formed.

At the position D of the machine the hooks or supports 3 are inserted to the required number in the button formed at the end of the rod by the mechanism H, this mechanism, as hereinafter described, including an automatic wire support, feeding, inserting and cutting-off mechanism. As each stem comes to rest at this position the mechanism H is started in operation, and after insertion of each support or hook radially in the button, the stem support 12 with the stem carried thereby is rotated through a definite predetermined angle depending upon the spacing to be given the supports. The drive for the hook inserting mechanism includes a beveled gear 50 on the end of the main drive shaft 31, a corresponding beveled gear 51 which is capable of being coupled to the shaft 52 by means of the clutch N, a pinion 53 carried by the shaft 52, a large gear 54 and a small gear 55. The clutch N also controls the mechanism for indexing the stem around after the insertion of each hook and this mechanism is as follows: The gear 54 meshes with the smaller gear 55 which is carried by a small shaft 57 and this shaft 57 in turn carries an actuating cam 58 (Figs. 7–8). The cam 58 upon each revolution of the shaft 57 actuates one end of the pivoted lever 59, the latter at its other end engaging the end of a reciprocable rack 60, suitable rollers 61 being provided between this lever and the reciprocable rack for minimizing wear and friction. The rack actuates a sector or segment 62 which is journaled upon the shaft 63 and has a one-way clutch connection with the gear 64 which in turn is journaled upon the shaft 63 and is connected through the intermediate gearing 65 and 66 with the gear 67 (Figs. 8, 10) which drives the clutch 68 for the stem holder 12. The one-way clutch mechanism between the sector 62 and the gear 64 includes a plurality of driving cams 69 which are pivotally carried at their inner ends by a disc member 70 fixed to the sector 62, the pivotal points being indicated at 71. The pivoted cam members 69 are carried within a recess formed in the gear member 64 and in one direction of movement of the sector 62 frictionally engages the periphery of the drum surface thereof to effect a driving connection, suitable springs 72 being provided to urge said connecting members 69 in a direction to form a driving connection. At each reciprocation, therefore, of the rack 60 through the ratchet and gearing shown the stem holder 12 is rotated through a definite angle and in this position comes to rest for the insertion of another hook or support. The angular movement may be adjusted and varied to effect the hook or support spacing desired by varying the effective stroke of the rack 60. In the particular embodiment shown, this is accomplished by providing an adjustable stop 74 for engaging the stop 75 carried by the rack 60. A spring 76 serves to return the rack 60 to its initial position, and by adjusting the stop 74 longitudinally of the rack the stroke may be varied and accordingly the angle of rotation imparted to the stem holder 12. In the particular embodiment shown, the adjustable stop 74 is carried by an adjustable shaft 77 mounted within a housing 78. A thumb screw 79 is provided for moving the arm 74 back and forth to effect the required adjustment, and a tightening nut 80 is shown for fixing the stop 74 and its shaft in the adjusted position. It is desirable also to provide a scale 81 with a pointer 82 carried by the adjustable stop 74 for indicating the proper spacing for the number of hooks to be inserted in the upper end of the stem rod. That is, by adjusting the pointer 82 to correspond to the numeral on the scale indicated, the hooks inserted according to the number indicated on the scale should have the required spacing.

The clutch 68 (Figs. 6, 10) is in the form of a disc with teeth on its upper surface for engaging the fingers 83 on the bottom of the stem holders 12. This clutch 68 is mounted upon a vertical reciprocable sleeve 84 and is normally maintained in clutching relation with the fingers 83 by means of a spring 85, the sleeve 84 passing over the shaft 86 to which is keyed the gear 67. The spring 85 surrounds the shaft 86 and is disposed between the gear 67 and the lower end of sleeve 84, the latter being provided with a depending skirt 87 which forms a housing for the spring and carries a double collar 88. The sleeve 84 is slidable up and down the shaft 86 but relative rotation is prevented by a pin 89 fixed to the sleeve and passing through a slot in the shaft 86. It is necessary to disengage the clutch 68 when the spider with its arms 11 moves forward one position, and this is effected during the operation of the Geneva driver 22, the latter carrying a cam 90 on its upper side which is so arranged that during the movement of the spider it engages the free end of a T-shaped lever 91 which is pivoted to the stationary part of the frame at 92, one end 95 of the cross engaging the collar 88 on the sleeve 84. I have indicated an adjustable screw 97 passing through a stationary part of the frame and serving as an adjustable stop for limiting the upward movement of the lever and the clutch 68. During the advancing movement, therefore, of the spider the cam 90 comes into operation to lower the clutch 68 out of the path of the advancing stem holders, and during this movement of the spider I have provided a pair of guide pins 93 for engaging a curved guide 94 (Fig. 9) in the stationary part of the machine and thereby maintaining the stem holder in its last angular position to which it was notched by the reciprocating mechanism.

I have thus indicated the construction and functioning of the mechanism for indexing each stem holder 12 as it comes to position D and also for effecting disengagement of the indexing drive when the spider moves from one position to the next. At position F on the machine where there is a hook inserting mechanism H' similar to the mechanism H at position D, the stem holders 12 must also there be indexed around to properly space the hook supports inserted in the lower button which is formed at position E of the machine. For this purpose there is a clutch mechanism 68' similar in construction to the clutch mechanism 68 just described at position D, the lever 91 which is controlled by the Geneva driver having a cross arm 96 corresponding to the cross arm 95 which functions with the clutch mechanism 68' in identically the same manner in which it functions with the mechanism 68 just described. The indexing is effected through the adjustable stroke mechanism above described including the sector 62, the one way clutch, the gear 64, the gears 65', 66' and 67'.

The control mechanism whereby the indexing of the machine, the indexing of the stem holders and the operation of the hook inserting mechanism are automatically and properly timed with relation to each other and whereby the machine may be readily changed from a machine for making stems for one number of hooks to a machine for making stems including another number of hooks will now be described. This control mechanism includes a pair of control members I and II which are mechanically coupled together and driven in time relation with the machine and automatically determine the periods of operation and the number of hooks inserted by the hook inserting mechanism H, H'. This is effected through the control of the clutch N which in turn controls, as above indicated, both the operation of the hook inserting mechanism H and the indexing mechanism for the stem holders for properly placing the hooks or supports inserted. The two control members I and II, while mechanically coupled together during the operation of the machine, are adjustable with relation to each other so as to vary the period of operation of the hook inserting mechanism to vary the number of hooks inserted. In the particular embodiment illustrated these control members I and II are in the form of disc cams carried by sleeves 100 and 101 respectively, which sleeves surround and are journaled around the shaft 63. The cam I and its sleeve 100 are connected with the drive gear 102, the latter meshing with a bevel gear 103 mounted on the main drive shaft. These sleeves 100 and 101 carrying the control members I and II are adjustably coupled together for varying their relative positions by means of the set screws 104 carried by an arm 105 mounted on the sleeve 101 and the cooperating circular toothed disc 106 carried by the sleeve 100. By withdrawing the set screw 104 the relative position between the sleeves 100 and 101 and the control members I and II may be varied as desired, and then the sleeves may be mechanically locked together by screwing home the set screw 104 into registry with the opening between two of the teeth on the disc 106. The control members of cams I and II effect respectively the closing and opening of the clutch N with the consequent starting and stopping of the hook-inserting mechanism and the indexing of the stem holders. For this purpose I have shown a lever arm 107 (Figs. 12–13) for effecting the opening and closing of the clutch N which lever arm is pivoted on the axis 108 and is rigidly connected with an arm 109, the latter being normally in engagement with the control member of cam II. The arm 109 upon being engaged by the raised part 110 of the control member II is urged outwardly in a direction to open the clutch N and into locking engagement with a bell crank lever 111, the latter being biased into locking position by a spring 112 and having the end 113 of one of its arms adapted to engage a corresponding locking end of the arm 109. The other arm 114 of the bell crank lever bears against the cam or control member I and upon being engaged by the raised part 115 of the cam or control member I the bell crank lever is actuated against the tension of the spring 112 to a position to disengage and unlock the arm 109 and the lever arm 107 and upon the release of the lever arms 107 and 109 the clutch N is automatically closed. The clutch N includes a small plunger 116 and an actuating compression spring 117 disposed within a recess formed in an enlarged part of the shaft 52 and an annular plate 118 fastened to the underside of the gear 51, this annular plate 118 having locking recesses 119 for the reception of the plunger 116 when in clutching engagement. The spring 117 tends to close the clutch so that when the actuating lever 107 is released the clutch is automatically closed. Upon the raised part 115 of the cam I throwing in the clutch for starting the hook inserting mechanism H, the indexing mechanism for the stem holder at position D begins to work and continues until the enlarged part 110 of the cam II engages the arm 109 to open the clutch N, the number of hooks inserted and the number of indexing operations of the stem holder depending upon this period of operation, the machine being driven at a constant speed. By varying the relative position of the raised parts 110 and 115 of the cams or control members II and I, this period of operation may be lengthened or shortened depending upon whether the number of hooks or supports is to be increased or decreased,—this varying adjustment being effected as above indicated. Ordinarily the spacing of the hooks or supports about the stem is to vary inversely with the number of hooks inserted and this adjustment is effected through the adjustment of the indexing stroke of the mechanism above indicated. After the completion of the hook inserting operation, the spider with its arms 11 must be indexed or advanced to the next position and this is effected through a clutch P which is thrown into operation by a control member III. This is carried by the sleeve 101 (Fig. 6) to rotate with the control member II. The clutch P is of similar construction to the clutch N, namely embodying a clutch mechanism similar to the plunger 116 and coupling plate 118 with a spring similar to the spring 117 normally urging the clutch into closed position. The control member III in the particular embodiment illustrated is in the form of a cam disc being circular for the greater portion of its circumference, having a portion cut away at 121. A bell crank lever having one arm 122 in engagement with this cam disc III normally holds the clutch P in open position through its other arm 123 engaging with the clutch plunger, but when the control member III rotates into a position where the arm 122 runs upon the cut away portion 121 of the cam disc, the clutch P is automatically closed and continues to be closed until the cam III turns in a position such that the arm 122 rides upon the increased diameter thereof. During this time when the clutch P is closed, the Geneva driver 122 makes one revolution and in doing so advances the Geneva 21 with the spider the distance of one position of the machine, and as above described during the movement of the Geneva driver 21 and the spider the cam 90 comes into operation to withdraw the clutches 68 and 68' from the spindle holders.

The number of hooks or supports inserted may be varied within limits determined by the time it requires for the control member II to make an approximately complete revolution. For example, if the adjustment is such that the enlarged part 115 of the cam I operates the lever 114 soon after the enlarged part 110 of the cam II rides off the corresponding enlarged part 109' of the arm 109, the cam II making nearly a whole revolution before throwing out the clutch, this would correspond to the maximum number of hooks or supports insertable by a machine with the particular drive shown,—as for example, twelve hooks or supports and for a lesser number of hooks, the control member or cam II rotates through an angle less than 360°, after the cam I starts the hook inserting mechanism H and before the latter is stopped, depending upon the number of hooks. For example, if there are six hooks to be inserted, the approximate rotation of the control or cam member II would be 180° between the starting and stopping of the mechanisms, if the total rotation of 360° corresponds to an insertion of twelve hooks. In order to minimize the loss of time incident to adjustments for less than the maximum number of hooks caused for example by the time required for the comparatively slow moving members I and II to return to the initial starting position after the insertion of the required number of hooks I have provided a special arrangement for effecting a quick return of the members I and II back to the initial position after the clutch N is thrown out by the cam II. This fast speed mechanism includes a drive consisting of the gear 126 on the main drive shaft, a bevel gear 127 meshing therewith, a larger gear 128 on the shaft and the gear 129 on the upper end of the shaft 63, the gear 129 being journaled for free movement on the outer sleeve 101 so as to rotate continuously. This gear 129 has a clutch member on its underside including the plurality of pins 130 mounted within recesses of the carrier 131 and in these recesses are disposed the spring pressed balls 132, normally urging the pins 130 to project beyond the carrier 131. The sleeve 101 also carries a clutch member 134 in the form of a slidable collar keyed thereto and an operating forked lever 135 pivoted at 136 on the main frame and straddling this collar clutch 134. The free end of the forked lever 135 carries a roller 137 which bears upon and follows the upper side surface of the cam member III. The raised part 138 of this cam engages the roller 137 and thereby actuates the clutch 134 into driving relation with the gear 129 and its corresponding clutch. This drives the sleeves 100 and 101 together with the control members at a substantially higher speed than through the slow drive from the gear 102. A ratchet coupling 140 is disposed between the disc cam I and the gear 102 to permit the fast forward movement of the control members. The fast speed is continuous until the control members are brought to the initial starting position, whereupon the clutch 134 is thrown out of engagement to permit the slow speed drive to again become effective, the lever 135 being retained in its upper position to keep the clutch 134 closed by a downwardly suspended U-shaped arm 141 which straddles the arm of the lever 135 and rides underneath the portion 135' thereon to hold it in the lifted position. The spring pressed plunger 142 normally urges the pivoted member 141 into this retaining position. For throwing out the fast speed clutch just before the control cam I throws in the clutch N, there is provided a control member IV mounted on the sleeve 100 with the member I and provided with the raised portion 143, this raised part 143 of the cam engaging the inwardly turned end of the holding member 141 to move it out into a position to permit the pivoted lever 135 to fall out of engagement with the gear 102, this occurring just before the cam I throws in the clutch N.

After the lower buttons are formed at position E, as described above, each stem is carried to position F where the hook or support inserting mechanism H' inserts the supports in the lower button. The drive for this mechanism includes the bevel gear 50 on the drive shaft, the bevel gear 51, the shaft 52, the clutch N therebetween, the pinion 53 carried by the shaft, the large gear 54 and the gear 150 and the shaft 151. A clutch M is disposed between the gear 150 and the shaft 151 so that in the event a smaller number of hooks or supports is desired to be inserted in the lower button, this may be effected by discontinuing the hook inserting mechanism H' prior to the stopping of the hook inserting mechanism H. Ordinarily in commercial lamps the lower button contains one less hook or support than the upper button and accordingly I have devised a special automatic means for stopping the hook inserting mechanism H' a sufficient time before the stopping of the mechanism H to avoid the inserting of the last hook or support. I accomplish this by means of a control or disc cam member V which is carried by the sleeve 101 to rotate with the other control members. This cam member has a raised part 152 which engages a lever 153 pivoted on the axis 108 and having an arm 154 rigid therewith for controlling the clutch M. This clutch M is similar to the construction of the clutch N above described, namely normally tending to close the clutch and when the arm 153 rides upon the raised part 152 of the disc cam V the arm 54 automatically throws the clutch M out of gear and maintains it out of gear until the clutch N is thrown out.

The hook or support inserting mechanisms H and H' are identical and a description of one will suffice. Each includes a vertical shaft 151 (Figs. 14–16) suitably journaled in a stationary part of the machine and carrying on its upper end a quadruple cam member S. The under side 160 of this cam, as the shaft rotates, engages a plunger rod 161 which is slidably disposed in the main frame 162 of the mechanism, and this plunger 161 engages at its lower end one arm 163 of a bell crank lever, the other arm 164 engaging a reciprocating block 165, the latter carrying a fixed gripper or jaw 166 and a cooperating pivoted jaw member 167. The latter is pivoted at 168, a spring 169 normally tending to urge the pivoted gripper 167 into gripping relation with the stationary gripper 166. The grippers 166 and 167 engage the wire 170 and feed it forward and insert it in the button of the stem when the reciprocating slide 165 is urged forward. The return movement of the slide 165 is effected through a spring 171 disposed in a suitable recess in the frame 162 and engaging a slidable plunger 172, the latter engaging a part of the slide 165 and normally urging it into retracted position. Adjustable screws 173 and 174 are provided for the bell crank lever 163–4 to make the necessary adjustments. When the stem holder is carried to either position D or F the support inserting mechanism is started and the reciprocating slide 165 is urged forward to insert the end of the wire 170. In the meantime a torch 175 has its flame directed against the edge of the button and at the point where the wire is to be inserted to raise the temperature at this spot above the temperature which it retains after being heated at the button forming position. Immediately upon the advancement of the grippers to insert the wire 170 into the button at the heated spot an air nozzle 176 is caused to direct an air blast against the spot where the wire is inserted to rapidly cool it. The mechanism for effecting this includes a source of air pressure, (not illustrated), controlled by a valve 178 leading to the air nozzle 176. The valve 178 has a valve operating member 179 which is normally in a closed position, but upon the rotation of the cam member S the cam surface or part 180 carried on the edge or side thereof comes into engagement with the arm 179 to open the valve for a short time to cause the air blasts 176 to play upon the heated button. This cooling blast remains for a sufficient time to cool the button, the cam 180 being constructed and arranged to effect this purpose. Ordinarily the blast of air is turned on before the grippers 166 and 167 begin their rearward movement, the grip on the wire 170 being sufficiently tight to feed the wire forward, but not tight enough to withdraw the wire from the button, especially after it has been cooled by the blast. A spring 179' tends to keep the valve closed. After the grippers 166 and 167 are withdrawn, a pair of pivoted cutting and forming members 181 and 182 including the cutting saws 183 and the hook forming members 184–5 and 208 are brought into operation to sever the wire and form the hook 186 in the support. The two members 181 and 182 are pivoted on the axes 190–1 and are fixed to shafts 190' and 191', and by rotating these shafts against the tension of spring 188 the knives and formers are brought into cooperation. The axle 191' has a crank arm 192 and the shaft of 190' has an operating member 193 at right angles thereto. The cam 189 carried by the cam member S on the upper side thereof operates a pair of similar slidable pins 195 which at their upper free ends engage respectively the members 192 and 193 to operate the cutters against the tension of the spring 188. This, as indicated, takes place after the withdrawal of the grippers 166 and 167. The hook forming members 184–5 are fixed to the operating arms 181–2 adjacent the knives, but the member 208 is in the form of a small pin independently movable and carried by the oscillatable shaft 209. The latter passes through the hollow shaft 191' and has an angle 209' which is engaged by a pin 195', the pin 195' being operated by the cam 189 against the tension of spring 208' to cause a downward movement of pin 208 and the bending of the cut end of the wire against the member 185 just after severance (Fig. 19). After the withdrawal and the severing of the supports or hooks the indexing mechanism for the stem is so timed as to turn the stem around a definite angle, and upon the indexing to the new angular position the part 160 of the cam S comes into operation to advance the wire and repeat the cycle. For cutting off the flame from the burner 175 during the application of the air blast, I have provided a shield 196, this shield 196 being carried by a lever pivoted at 197 and the shield being adapted to be brought in between the flame and the button while the air is playing thereupon. This is effected through a cam 198 carried by the cam member S and on the periphery thereof. This cam 198 engages a member 199 on the lever to bring the shield 196 into shielding operation between the flame and the button. A spring 200 normally tends to maintain the shield in the inoperative position. The whole frame of the hook inserting mechanism is adjustable up and down by means of a set screw 201 to obtain the proper elevation of the inserting machine. I have indicated a means for adjusting the stroke of the knife frame 181 with respect to the frame 182. This means includes an adjustable split collar 203 formed as part of arm 193 for adjusting the angular positions of the knife carrying arm 181 upon its respective shaft 190'. A screw 202 is indicated for tightening and fixing the collar 203 to the shaft 190' in any adjusted position. In Fig. 19 I have indicated diagrammatically the series of steps at each inserting operation.

In Fig. 20 I have indicated diagrammatically a system of manifold connections for air and gas wherein 205 represents the burner for forming the upper button, 206 the burner at position D for heating the button and 207 the cooling blast therefor. 205', 206' and 207' are corresponding heaters and cooler for the lower button.

In Fig. 20ª I have shown diagrammatically certain of the drive and control mechanisms with their designating marks applied and indicating the general arrangement thereof.

Having thus described my invention, what I claim and desire to protect by Letters Patent is:

1. In a hook inserting machine for electric bulb mounts, a rotatable mount holder, a reciprocable hook inserter, driving means for giving to said mount holder intermittent angular movements, a driving mechanism for reciprocating the hook inserter during the rest periods of the mount holder, a clutch for controlling said drive mechanisms, a controlling mechanism for said clutch for initiating and starting said drive mechanisms and means associated with the controlling mechanism for readily adjusting the number of reciprocations of the hook inserting devices and the angular movements of said mount holder.

2. In a machine for inserting hooks or supports in mounts for electric bulbs, a mount holder adapted to carry a mount and to be intermittently and progressively rotated through predetermined angles, a reciprocating hook inserting device adapted to insert hooks in a mount carried by said holder during the rest periods thereof, driving means for alternately rotating said mount holder through predetermined angular movements and reciprocating said hook inserter, and a controlling mechanism for initiating and arresting the movements of said mount holder and said hook inserter including a readily adjustable device whereby the number of reciprocations for the hook inserter and corresponding angular movements for the mount holder may be varied at the will of the operator.

3. In a machine for inserting hooks or supports in electric bulb mounts, a mount holder adapted to be intermittently and progressively rotated through definite predetermined angular movements, a hook inserting mechanism including a reciprocating device for inserting hooks in said mount during the rest periods of the mount holder, a drive for said mount holder and said hook inserting device including a clutch, a pair of relatively adjustable cams driven in time relation with the main drive mechanism, one of said cams closing said clutch and the other of said cams opening said clutch.

4. In a machine of the character set forth in claim 3 wherein the driving mechanism for the mount holder includes means for varying the angular movements of the mount holder corresponding to the relative adjustment of the cams.

5. In a machine for inserting supports in the mount stems for electric bulbs, a mount holder adapted to be intermittently and progressively rotated through definite predetermined angular movements, a hook inserting mechanism including a reciprocating head for inserting hooks in said stem during the rest periods of the mount holder, a drive for said mount holder and said hook inserting device, including a clutch mechanism, a pair of relatively adjustable control members driven in time relation with the main drive mechanism, one of said control members closing and the other opening said clutch mechanism for determining the number of reciprocations of the reciprocating device, and the drive for said mounted holder including an adjustable mechanism whereby the mount holder is advanced a predetermined angular movement corresponding to the number of reciprocations of the hook inserting device so as to distribute the supports uniformly about the stem mount carried by the bulb holders.

6. A machine of the character set forth in claim 5 wherein the mount holder drive includes a cam driven and controlled through the clutch mechanism and a variable stroke ratchet drive for varying the angular movements of the mount holder and corresponding to the number of supports to be inserted in the mount stem.

7. In a machine for inserting supports in mount stems of electric bulbs, a support inserting mechanism including a reciprocating support advancing device for inserting supports in the mount stems, a drive for said support inserting mechanism including a clutch mechanism, a pair of control members driven in time relation with the drive for the hook inserting mechanism, one of said control members functioning to close the clutch mechanism and the other functioning to open said clutch mechanism and arrest the operation of the support inserting mechanism and an adjustment mechanism associated with said control members whereby one may be readily adjusted relatively to the other so as to control and predetermine the number of supports inserted at each operation.

8. In a machine of the character set forth in claim 7 including a rotatable mount-holder disposed adjacent a support inserting mechanism and adapted to be intermittently and progressively rotated through definite predetermined angular movements and a drive therefor including an adjustable mechanism for varying angular movements of the mount holder in accordance with the number of reciprocations of the support inserting mechanism so as to distribute the supports uniformly about the stems.

9. In a machine for inserting supports in the mount stems of electric bulbs, a support inserting mechanism, a drive therefor including a main drive shaft and a clutch, a pair of control members coupled to said drive shaft for continuous forward movement by a one-way clutch, an adjustable mechanism associated with said control members, one of said control members opening and the other closing said clutch, said clutch associated with the support inserting mechanism, and adjustment mechanism associated with said control members whereby one may be adjusted relatively to the other to vary the time of operation of the support inserting mechanism, a second control mechanism between said control members and the drive shaft including a clutch and a fast speed gearing for driving said control members at a fast forward speed independently of the one-way clutch and a second pair of control members associated with the aforesaid control members to throw in said fast speed clutch when the support inserting mechanism is arrested and throw out said fast speed clutch when the control members return to the initial starting position.

10. In a machine of the character set forth in claim 5 wherein the drive for the control members includes a one-way connection for driving said control members in time relation with the support inserting mechanism and a second fast speed drive for driving said control members independently of the one-way drive and to bring the control members back to the initial starting position, together with devices associated therewith for connecting in the fast drive when the support inserting mechanism is thrown out and disconnecting said fast drive when the control members return to the initial starting position.

11. In a machine for inserting supports in the mount stems of electric bulbs, an intermittently and progressively rotating main frame carrying a plurality of rotatable mount holders, a main drive shaft, an intermittent drive for said main frame including a clutch, a support inserting mechanism disposed adjacent the main frame and adapted to insert supports in the stems carried by said mount holder as they progressively advance thereto and come to rest, a drive for said mount holders as they come to rest including means for disengaging said drive during the advance of the main frame from position to position, said drive including means for giving to said mount holder predetermined progressive angular movements, a clutch mechanism controlling the operation of the support inserting mechanism and the mount drive, a pair of control members driven in time relation with the main drive shaft, one of said members closing such clutch mechanism and the other of said members opening said mechanism, and an adjusting device disposed between said control members whereby they may be relatively adjusted to control the duration of the operation of the support inserting mechanism and the mount holder, and means driven in time relation with the control members for operating the clutch controlling the main drive during the rest period of the support inserting mechanism and the mount drive.

12. In a machine for inserting supports in the mount stems for electric bulbs, a pair of mount stem holders, a pair of support inserting mechanisms and a main drive therefor, including a clutch mechanism, a second clutch disposed between said clutch mechanism and one of said support inserting mechanisms, means operating in time relation with the main drive for controlling said first clutch mechanism for maintaining said clutch mechanism operative during a predetermined period so as to insert a predetermined number of supports in a mount stem and a device operating in time relation with said control means for throwing out said second named clutch and arresting the support inserting mechanism control by it before the arrest of the other support inserting mechanism.

13. In a machine for inserting supports in the mount stems of electric bulbs, a pair of mount holders, a pair of support inserting mechanisms disposed respectively adjacent said mount holders, a main drive for said support inserting mechanism including a control mechanism therefor, control devices driven in time relation with the main drive and cooperating with said control mechanism for the support inserting mechanisms for operating them through periods of different duration.

14. In a machine for inserting supports in mount stems of electric bulbs, a pair of rotatable mount holders, a drive therefor including an adjustable stroke mechanism for intermittently and progressively rotating the mount holders through predetermined angular movements, a pair of support inserting mechanisms disposed adjacent said mount holders, a main drive shaft, a clutch mechanism controlling both said mount holder drive and said support inserting mechanisms, a second clutch disposed in the drive of one of the support inserting mechanisms, controlling devices driven in time relation with the main drive and operating upon said first clutch mechanism to initiate the operation of the mount holder drive and one in the support inserting mechanism and causing the same to continue through a definite predetermined period, and a second control device also driven in time relation with the main drive to cause the second support inserting mechanism to operate through a shorter period than the first.

15. A machine of the character set forth in claim 14 wherein the control devices for the clutch mechanisms are relatively adjustable with reference to each other to vary the time of operation of and the number of hooks inserted by the support inserting mechanisms during an operating period.

16. In a machine for inserting supports in stems for incandescent lamps, the combination of a rotatable frame, a multiplicity of revoluble stem holders carried by said rotatable frame, a support inserting device situated at one of the stations of said rotatable frame, driving mechanisms for simultaneously driving said support inserting device and indexing one of said stem holders in time relation therewith, means for heating the part of the stem in which the supports are to be inserted, a clutch controlling the operation of said driving mechanisms, driving means including a clutch for intermittently indexing the rotatable frame carrying the stem holders, and a readily adjustable control mechanism for controlling said clutches and effecting the indexing of the rotary frame, initiating the starting of the support inserting device and the indexing mechanism for the stem and arresting the movements of the device and the indexing mechanism.

17. A machine of the character set forth in claim 16 including a second support inserting device located at another station of the machine which is operated in time relation with the first support inserting mechanism and is responsive to the readily adjustable control mechanism to vary the number of hooks inserted but to insert one less support than is inserted in each stem by the first named support inserting device.

18. In a machine for inserting hooks or supports in mounts for electric bulbs, a mount holder adapted to carry a mount and to be intermittently and progressively rotated through predetermined angles, a reciprocating hook inserting device adapted to insert hooks in a mount carried by said holder during the rest periods thereof, a main drive shaft connected with said mount holder and said reciprocating hook inserter to drive them at a fixed rate of speed with reference to the main drive shaft and a controlling mechanism for arresting the movements of said mount holder and said hook inserter, including a readily adjustable device whereby the number of reciprocations for the hook inserter and the corresponding angular movements of the mount holder may be varied at the will of the operator without varying the speed thereof relatively to the main drive.

19. In a machine for inserting hooks or supports in mounts for electric bulbs, a mount holder adapted to carry a mount and to be given angular indexing movements, a reciprocating hook inserting device adapted to insert hooks in a mount carried by said holder, a main drive shaft, driving connections between said hook inserter and the drive shaft including a clutch and means driven in time relation with the main drive shaft for disconnecting said clutch after a predetermined period of operation including a readily adjustable device whereby the number of reciprocations for the hook inserter may be varied at the will of the operator without varying the speed of operation of the hook inserter relatively to the main drive.

20. In a machine for inserting a series of hooks or supports in mounts for electric bulbs, a mount holder adapted to carry mounts and to be given angular indexing movements, a hook inserting device adapted to insert hooks in a mount carried by said holder, a main drive shaft, connections including a control mechanism for driving said hook inserting device from said main drive shaft and means driven in time relation with said main drive shaft and adapted to operate said control mechanism and arrest the movement of the hook inserter after a predetermined movement of the main drive, including a readily adjustable device whereby the number of reciprocations of the hook inserter for each movement of the main drive may be varied without varying the speed of operation of the hook inserter with reference to the main drive.

21. In a machine for inserting hooks or supports in mounts for electric bulbs, a mount holder adapted to carry a mount and to be given angular indexing movements, a reciprocating support inserting device adapted to insert supports in a mount carried by said holder, a main drive shaft, driving connections between said support inserting device and said main drive shaft, a control member driven from said main drive shaft and adapted to control the driving connections, a second control member which is normally fixed with reference to the first control member but which is readily adjustable with respect thereto and operable to disconnect the aforesaid driving connections after a predetermined movement of the main drive shaft.

22. In a machine for inserting hooks or supports in mounts for electric bulbs, a mount holder adapted to carry a mount and to be given angular indexing movements, a support inserting device adapted to insert supports in a mount carried by said holder, a main drive shaft, driving connections between the support inserting device and the main drive shaft, a control member driven in time relation with said drive shaft and adapted to initiate the starting of the support inserting device, a second control member normally fixed with reference to the first control member and driven thereby but readily adjustable with reference thereto and operable to disconnect the aforesaid driving connections after a predetermined movement of the main drive shaft.

23. In a machine for inserting hooks or supports in mounts for electric bulbs, a mount holder adapted to carry a mount and to be given angular indexing movements, a support inserting device adapted to insert supports in a mount carried by said holder, a main drive shaft, driving connections between the support inserting device and the main drive shaft, a control member driven in time relation with said drive shaft and adapted in one position to start the operation of the support inserting device, a second control member normally fixed with reference to the first control member and driven thereby but readily adjustable with reference thereto and operable to disconnect the aforesaid driving connections after a predetermined movement of the main drive shaft, and a quick return driving mechanism between the control members and the main drive shaft which is operable when the operation of the hook inserting device is arrested, to effect a quick return of the control members to the starting position.

24. In a machine of the character set forth in claim 23 wherein the quick return driving mechanism between the main drive shaft and the control members is automatically arrested when the control members are returned to the starting position.

In testimony whereof, I have signed my name to this specification.

CHARLES EISLER.